US012091171B2

(12) United States Patent
Arnold

(10) Patent No.: US 12,091,171 B2
(45) Date of Patent: Sep. 17, 2024

(54) UNMANNED AERIAL VEHICLE

(71) Applicant: Valmet Technologies Oy, Espoo (FI)

(72) Inventor: Paul Arnold, Cernay (FR)

(73) Assignee: Valmet Technologies Oy, Espoo (FI)

( * ) Notice: Subject to any disclaimer, the term of this patent is extended or adjusted under 35 U.S.C. 154(b) by 142 days.

(21) Appl. No.: 17/751,347

(22) Filed: May 23, 2022

(65) Prior Publication Data

US 2022/0380044 A1    Dec. 1, 2022

(30) Foreign Application Priority Data

May 25, 2021  (EP) .................................... 21175611

(51) Int. Cl.
| | |
|---|---|
| *B64C 39/02* | (2023.01) |
| *B64C 1/08* | (2006.01) |
| *B64D 47/08* | (2006.01) |
| *B64U 10/10* | (2023.01) |
| *B64U 50/19* | (2023.01) |
| *B64U 101/00* | (2023.01) |

(52) U.S. Cl.
CPC .............. *B64C 39/024* (2013.01); *B64C 1/08* (2013.01); *B64D 47/08* (2013.01); *B64U 10/10* (2023.01); *B64U 50/19* (2023.01); *B64U 2101/00* (2023.01)

(58) Field of Classification Search
CPC ......... B64C 39/024; B64C 1/08; B64D 47/08; B64U 10/10; B64U 50/19; B64U 2101/00; B64U 10/16; B64U 20/30; B64U 2101/29; B64U 2101/30
See application file for complete search history.

(56) References Cited

U.S. PATENT DOCUMENTS

| | | | | |
|---|---|---|---|---|
| 6,565,321 | B1* | 5/2003 | Illingworth | B64U 30/26 |
| | | | | 416/185 |
| 8,251,307 | B2* | 8/2012 | Goossen | B64D 1/22 |
| | | | | 244/76 R |
| 9,963,230 | B2* | 5/2018 | Borman | B08B 1/143 |
| 10,046,857 | B2* | 8/2018 | Azaiz | B64C 39/024 |
| 10,150,562 | B2* | 12/2018 | Hein | B64U 50/16 |
| 10,384,781 | B2* | 8/2019 | VanHaelst | B08B 3/024 |
| 10,399,676 | B2* | 9/2019 | Dahlstrom | B64D 1/18 |
| 10,413,763 | B2* | 9/2019 | Won | B64U 30/293 |
| 10,618,652 | B2* | 4/2020 | Tamkin, Sr. | A47L 1/02 |
| 10,618,656 | B2* | 4/2020 | Campbell | B64C 29/0033 |
| 10,812,992 | B1* | 10/2020 | Tran | H04B 7/0617 |
| 11,192,633 | B1* | 12/2021 | Moro-Ludena | B64C 39/06 |
| 11,192,648 | B1* | 12/2021 | Bayoumi | G05D 1/0094 |

(Continued)

*Primary Examiner* — Medhat Badawi
(74) *Attorney, Agent, or Firm* — Stiennon & Stiennon

(57) ABSTRACT

An unmanned aerial vehicle (UAV) has a multicopter section for flying in air with an attached blower section for generating an air stream for blowing dust off surfaces. A flight controller controls the multicopter section, a blower controller controls the blower section, and a power supply supplies power to the multicopter and blower sections. The flight controller and the blower controller are connected, and the blower controller is adapted to supply blower control commands to the flight controller to compensate for the thrust of the air stream from the blower section by flight control of the multicopter section. The UAV may be enclosed by a protective cage in the form of a meshed polyhedron, wherein the rods of the meshes are elastically connected at the respective nodes.

3 Claims, 3 Drawing Sheets

(56) References Cited

U.S. PATENT DOCUMENTS

Figure 1:
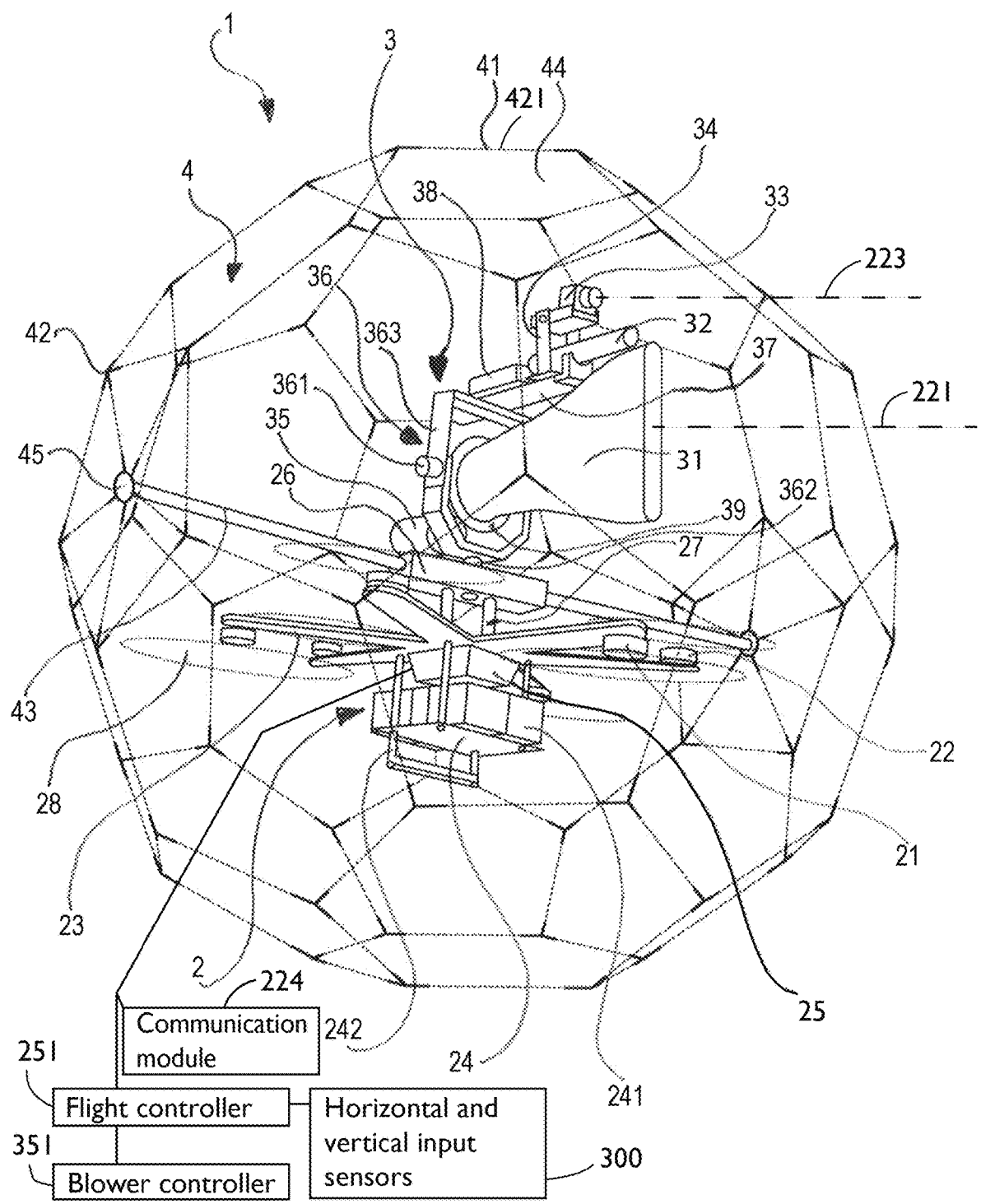

| | | | | |
|---|---|---|---|---|
| 11,235,890 | B1* | 2/2022 | Dahlstrom | B64U 10/60 |
| 11,498,090 | B2* | 11/2022 | Thompson | B64C 39/024 |
| 11,783,465 | B2* | 10/2023 | Dominguez | H04N 23/695 |
| | | | | 348/144 |
| 2007/0262195 | A1* | 11/2007 | Bulaga | B64C 27/20 |
| | | | | 244/12.4 |
| 2013/0134254 | A1* | 5/2013 | Moore | B64C 39/022 |
| | | | | 244/17.11 |
| 2015/0274294 | A1* | 10/2015 | Dahlstrom | E04G 23/002 |
| | | | | 239/722 |
| 2015/0344136 | A1* | 12/2015 | Dahlstrom | G05D 1/0866 |
| | | | | 239/722 |
| 2016/0082460 | A1* | 3/2016 | McMaster | B64U 10/14 |
| | | | | 239/722 |
| 2017/0113799 | A1* | 4/2017 | Kovac | B64C 25/00 |
| 2017/0305547 | A1* | 10/2017 | Tamkin, Sr. | B64C 39/024 |
| 2018/0118337 | A1* | 5/2018 | Viel | G05D 1/0094 |
| 2019/0009893 | A1* | 1/2019 | Toyama | B64U 10/14 |
| 2019/0100313 | A1* | 4/2019 | Campbell | B64D 1/02 |
| 2019/0168875 | A1* | 6/2019 | Ashur | B08B 3/024 |
| 2019/0366375 | A1* | 12/2019 | Thompson | B05B 15/534 |
| 2020/0207462 | A1* | 7/2020 | Kim | B64C 39/024 |
| 2021/0061463 | A1* | 3/2021 | Briod | B64D 47/08 |
| 2021/0237888 | A1* | 8/2021 | Wong | G05D 1/69 |
| 2021/0237897 | A1* | 8/2021 | Gury | G05D 1/102 |
| 2021/0273422 | A1* | 9/2021 | Lavoie | B64C 39/02 |
| 2021/0299311 | A1* | 9/2021 | Yu | B64U 50/19 |
| 2021/0311502 | A1* | 10/2021 | Ghio | B64F 1/362 |
| 2021/0339845 | A1* | 11/2021 | Milan | B64U 30/299 |
| 2022/0066456 | A1* | 3/2022 | Ebrahimi Afrouzi | |
| | | | | G06F 3/04883 |
| 2022/0097865 | A1* | 3/2022 | Sidoti | A63H 27/12 |
| 2022/0119109 | A1* | 4/2022 | Lee | B64B 1/40 |
| 2022/0134217 | A1* | 5/2022 | Sohn | A63F 7/3065 |
| | | | | 463/6 |
| 2022/0174932 | A1* | 6/2022 | Ravanat | A01M 5/02 |
| 2022/0380044 | A1* | 12/2022 | Arnold | B64D 47/08 |
| 2022/0411052 | A1* | 12/2022 | Angelucci | B64U 30/297 |
| 2023/0019134 | A1* | 1/2023 | Thompson | B05B 13/005 |

* cited by examiner

UNMANNED AERIAL VEHICLE

CROSS REFERENCES TO RELATED APPLICATIONS

This application claims priority on EP21175611, filed May 25, 2021, the disclosure of which is incorporated by reference herein.

STATEMENT AS TO RIGHTS TO INVENTIONS MADE UNDER FEDERALLY SPONSORED RESEARCH AND DEVELOPMENT

Not applicable.

BACKGROUND OF THE INVENTION

The invention relates to an unmanned aerial vehicle (UAV). This UAV is used for cleaning industrial facilities and is particularly used to blow off dust from surfaces on which it has piled up.

Dust can become a problem not only for the runnability of the machines situated in an industrial facility, but dust can also pose a risk of fire, or even explosions under particular circumstances. Therefore, manual cleaning is a routine task in industrial facilities. This is time consuming and expensive work and there are places in the facilities which are even difficult, if not impossible, to reach by the cleaning personnel. In order to cope with these problems, the use of UAVs under remote control or even in autonomous operation has been considered.

US 2018/0118337 A1 describes a cleaning drone (UAV) for cleaning housing spaces or offices which, in a flying version, carries a single fan or an array of blowers as a payload which produces an air stream transverse to the propulsion air stream. This air stream can be used for cleaning vertical and horizontal surfaces. If an array of blowers is used, they are controlled to produce air streams in opposite directions to compensate for the forces induced to the drone by thrust of the air streams. If only a single fan is used, the thrust generated by the single fan is then compensated for by the drone. Thus, the fan is switched on, and the movement of the drone due to the thrust of the fan will then be compensated by flight control in reaction to the displacement of the drone.

For efficiently cleaning industrial facilities which are dusty environments, powerful blowers should be used to generate strong air streams for efficiently removing layers of dust. Such powerful blowers generate a strong thrust transversely to the propulsion air stream which actually carries the UAV in the air. If the compensation of the displacement of the UAV from its position is controlled following its actual displacement due to thrust, the position control of the UAV inevitably has a delay and becomes less precise.

Additionally, since the flight control has to compensate for the lateral thrust as a disruptive force—which is a strong force in cleaning industrial facilities with strong air streams—compensating control tends to become unstable, if the control tries to quickly compensate strong disruptive forces by strong control commands. Such instability may further degrade the precision of the position control.

Furthermore, the efficiency of the air stream for dust removal rapidly decreases with an increase of the distance between the blower outlet and the surface to be treated. If position control of the UAV is delayed while the UAV flies along the surfaces to be cleaned, the flying path becomes wavy and an uneven and locally insufficient cleaning result will be obtained. Therefore, an improved accuracy of the flight control of the UAV is necessary to increase the efficiency of the dust removal by air streams.

SUMMARY OF THE INVENTION

A multicopter is a mechanically simple aerial vehicle whose motion is controlled by speeding or slowing multiple downward thrusting motor/propeller units. The invention is an unmanned aerial vehicle (UAV) i.e., an aircraft piloted by remote control or onboard computers. The UAV of the invention has a flight controller controlling a multicopter section with downward thrusting motor/propeller units and a blower controller controlling a blower section, wherein the fight controller and the blower controller are connected, and the blower controller is adapted to supply blower control commands to the flight controller.

Communication between the flight controller controlling the blower controller has the effect that the flight controller is early informed about the expected thrust of the blower before the thrust actually occurs. Accordingly, an adequate flight control of the UAV may be early initiated, e.g., by tilting the UAV, so that the lifting/propulsion air streams act timely against displacement due to the thrust. As a result, position control becomes more accurate, and the cleaning result is improved.

Due to the early information from the blower controller the flight controller generates commands which are adequately strong so that stable control of the UAV is obtained. In particular, there is a certain delay between the timing when the blower is switched on, and the period after which the blower has built up to the full intensity of the blower air stream, and thereby generating the thrust. Since the timing of the switching on of the blower is transmitted to the flight controller, an appropriate control measure or countermeasure such as tilting the UAV, can be time controlled, so that build-up of the thrust and appropriately increasing the countermeasure can be synchronized. As a result, the flight remains stable and position control of the UAV is improved, thereby increasing the cleaning efficiency.

As a further side effect, since position control of the flight is improved, safety margins may be reduced, making possible, for example, flying through narrow passages while cleaning.

An analogue device can be used to control the blower, so the blower controller has a potentiometer which is used to control air stream intensity of an air stream generated by the blower section e.g., by controlling the power supplied to the blower motor. The blower controller is arranged to input the potentiometer value into the flight controller so a flying position of the multicopter section can be set which compensates for air stream thrust. As described, this is one way to define and detect the blower control parameter, so that the flight controller can anticipate the expected thrust and can suitably carry out flight control. Alternatively a digital control can be used, e.g., (pulse-width modulation) PWM-control can control the power supplied to the blower motor blower, and the blower PWM-control value can be input to the flight controller.

Preferably, the blower section comprises at least one blower and/or a nozzle, wherein the blowing direction of the blower or the nozzle is adjustable relative to the multicopter section, and the blower controller is adapted to supply a blowing direction information to the flight controller. In a typical scenario, the orientation (blowing direction) of the blower (with its nozzle) is once adjusted and will not be changed during operation of the UAV. If the adjustment is frequently changed, the orientation may be detected by sensors, and the detected value may be input to the flight controller to allow a precise anticipation of the expected thrust.

As for the blower, various types of fans (axial or radial) can be used. Preferably, the blower comprises a turbine fan comprising a turbine and a nozzle. The application of such powerful turbine fans may develop a thrust of 2 to 10 N when applied to a UAV of up to 2 kg of weight and may even lead to 5 to 50 N of thrust when applied to a UAV of up to 10 kg.

Preferably, the blower section is attached to an adjustable support fixed to the multicopter section, wherein the support is adapted to set and maintain the position and orientation of the blower section with regard to a preselected coordinate system. As the support forms the binding link between the blower section and the multicopter section, and since flight control of the multicopter section is the main control task, it is preferable if the blower section is adjusted in the intended orientation and this orientation is defined in the coordinate system of the multicopter section such as x for forward/rearward direction, y for left/right direction and z for up/down direction for example.

Generally, the multicopter section comprises at least three arms extending in a radial direction from a central portion of the multicopter section, wherein the arms are arranged on a plane with substantially equal angles between each other, each arm carrying at least one motor and at least one propeller at its radial outer end. Preferably, the UAV is provided with four or six arms each of them carrying a motor and a propeller at its far (radial outer) end.

In such an arrangement, motors and propellers may be arranged such that each second propeller counted in a circumferential direction of the UAV is arranged above the corresponding arm, while the adjacent propellers are arranged below their corresponding arm. In this way, the propellers may be arranged with their central axes closer to each other so that a certain overlap of propellers' rotation areas is possible without collision of the propellers.

A compact layout of the multicopter section is of particular advantage if the UAV is provided with a protective cage surrounding the unmanned aerial vehicle including its propellers. Such a protective cage is an efficient measure against any damage of either the UAV or of objects in the environment as well as against injury of persons.

Apart from the safety issue, preferably the protective cage has the shape of a circular cylinder, a hemisphere, a sphere, a regular polyhedron, or a polyhedron sphere made up from pentagons and hexagons, wherein the protective cage is fixed to the unmanned aerial vehicle by a support allowing rotation of the protective cage around the unmanned aerial vehicle. By means of such a protective cage, a very strong blow can be ejected from the blower section while the UAV is supported in flight and pushed against e.g., a wall, by the thrust. A rolling movement of the protective cage allows a movement of the UAV in a state in which it is supported by the wall.

Preferably, the protective cage comprises a mesh body, wherein the nodes of the meshes are separate from and connected to rods or carbon fiber pipes, wherein the nodes and the rods or carbon fiber pipes are connected by elastic sleeves at least partly overlapping and elastically enclosing the nodes and the rods or carbon fiber pipes. The nodes and the rods or carbon fiber pipes are typically fixed to each other by gluing. However, in case of a collision of the UAV with a hard surface, this connection may break if strong forces are applied. Using the elastic sleeves enclosing the nodes and the rods or carbon fiber pipes, a soft connection between these elements can be maintained even if the connection is broken. Additionally, there is the particular effect that no debris will be released but will be maintained inside the sleeves in case of such collision, which debris may cause severe damage to machinery accommodated in the industrial facility. Besides, it is certainly easier to simply collect the complete UAV after such collision than collecting scattered debris from the ground/machinery.

Preferably, the UAV is equipped with at least one camera preferably attached to the blower section and oriented in the air stream direction, wherein the camera is adapted for flying the unmanned aerial vehicle by remote control and through video link (FPV). The camera is oriented in the blowing direction so that the cleaning effect is visible at a remotely positioned video screen. Flying the UAV via video link including signals from this camera allows precise cleaning by adequate flight control. If a wide-angle camera is used, the perception of the position of the UAV by the remote pilot will be improved.

Preferably, the UAV is equipped with a laser pointer attached to the blower section and oriented in the air stream direction, wherein the laser pointer is adapted to mark the target of the air stream.

Preferably, the UAV is equipped with a stereo camera which may be provided instead of, or in addition to, the camera pointing in the air stream direction. Advantageously, the flight controller is adapted to evaluate a video signal produced by the stereo camera for estimating the UAV's position relative to objects to be cleaned. Using the stereo camera, the flight controller may also produce position information of the UAV with regard to its environment, in order to provide support of the remote pilot (collision avoiding control) or may even allow a fully autonomous flight.

Preferably, the power supply of the UAV comprises at least one rechargeable battery for the multicopter section as well as at least one rechargeable battery for the blower section. Alternatively, a power supply cable may be provided to connect to a ground-based power source. The UAV with the blower needs a considerable amount of power for flight and cleaning. If rechargeable batteries are used, separate batteries are provided for flight and cleaning, in order to avoid the sudden power request upon switching-on of the blower adversely affecting flight of the UAV due to voltage drops in the power supply. As for the power supply by cable, the cable may be provided from the ceiling and may even further comprise an automated cable winding system, so that the load induced by the cable on the flying UAV is reduced. Cable solutions to the supply of power are particularly interesting if the cleaning areas extend along long and straight structures.

Preferably, the UAV is designed such that, in the flight position, the blower section is arranged above the multicopter section. This has the particular advantage that the blower section, which carries the camera and/or laser pointer and/or stereo camera, is positioned above a dust generation area, wherein the propulsion air stream which is generated carries the dust downward following propulsion the air stream. Therefore, this dust will not reach the cameras etc. Additionally, the transverse or cleaning air stream will consist of substantially clean air so that the a new deposition of dust by the cleaning air stream is avoided. Furthermore, dust blown off surfaces by the cleaning air stream will also descend due to gravity and will be transported downward further by the propulsion air stream.

Preferably, the nozzle comprises a grid of internal air guides for vortex control in the air stream. For smooth dust removal, it is beneficial if the cleaning air stream extends straight and reaches as far as possible in an open jet. Control of the flow in the nozzle by the grid of air guides inside the nozzle allows an improved setting of the flow parameters to optimize the open jet released from the nozzle opening.

BRIEF DESCRIPTION OF THE DRAWINGS

Embodiments of the invention will be described below under reference to the drawings.

FIG. 1 is a perspective overall view of a UAV according to one embodiment, with certain elements shown schematically.

FIG. 2 is a perspective overall view of a UAV according to a modified embodiment.

FIG. 3 is a sectional view of a detail of a protective cage.

DESCRIPTION OF THE PREFERRED EMBODIMENTS

FIG. 1 shows an overall view of an embodiment of a UAV 1 which comprises a multicopter section 2, a blower section 3, and a protective cage 4. The protective cage 4 has of a plurality of carbon fiber rods 41 connected to a plurality of nodes 42 so as to form a polyhedron body of a plurality of mesh 44 units. This protective cage 4 has a generally spherical shape and fully encloses the multicopter section 2 and the blower section 3. The multicopter section 2 and the blower section 3 are supported by a beam 43, which beam 43 is supported by the protective cage 4. The size of the mesh units 44 in relation to the thicknesses of the carbon fiber rods 41 and the nodes 42 is large enough so that sufficient collision protection is achieved without substantially affecting flying behavior of the UAV 1.

A cage bearing 45 (only one is shown although two are provided) supports the protective cage 4 rotatably to the beam 43. In case a cleaning task requires a very strong cleaning air stream, the UAV 1 may lean or engage against a (rear) wall or other object, opposite to the cleaning air stream, so as to be supported against strong thrust produced by the cleaning air stream. By rotating around cage bearings 45 the protective cage 4 may roll on the wall to allow a lifting/lowering movement of the UAV 1. Of course, although not shown in this embodiment, a suitable gimbal may be added instead of the simple cage bearings 45 which further allows other rotation directions of the protective cage 4 relative to the multicopter section 2 and the blower section 3.

The UAV 1 has the blower section 3 arranged above the multicopter section 2 in flying position as is depicted in FIG. 1. A connector block 26 which is supported on the beam 43 has two studs 27 extending towards the multicopter section 2 and supports it at the connector block 26. The studs 27 are hollow inside, so as to form tubes which allow the passage of electric wires from/to the multicopter section 2 to/from the blower section 3.

The multicopter section 2 has a set of radially extending arms 23 which are arranged in a stellate configuration. The arms 23 extend in a common plane. In the UAV of FIG. 1, the stellate configuration has six arms 23. The radial outer end of each arm 23 carries a motor 21 or a motor 22. The motors 21 and 22 are alternatingly arranged on the arms 23 such that each motor 21 is arranged between motors 22, and each motor 22 is arranged between motors 21. The motors 21 are arranged such that the free end of the motor shaft (not shown) extends downward from the associated arm 23, while the motors 22 are arranged such that the free end of the motor shaft (not shown) extends upward from the associated arm 23. Each free end of each motor shaft is equipped with a propeller 28 (shown as dotted circle lines in FIG. 1) which propeller 28 generates a downward air stream which makes the UAV fly. This air stream is here also called the propulsion air stream.

Here, the propellers 28 are arranged in two parallel planes, one plane being defined by the propellers 28 carried and driven by the motors 21 and the other plane being defined by the propellers 28 carried and driven by the motors 22. In this way a certain overlap of the rotation planes of adjacent propellers 28 allows a compact arrangement of the propellers 28.

A flight controller 251 is arranged in a box-shaped controller housing 25 which is fixed to the arm arrangement of the arms 23. Antennas, wiring etc. required for the operation of the flight controller 251 are not shown but may be arranged on the arms 23, the studs 27, the beam 43 or portions of the multicopter section 2. A rack 242 supports a power source 24 at the arms 23. The power source 24 contains two rechargeable flight batteries 241. The rack 242 may also serve as or carry antennas etc. The controller housing 25 further accommodates a communication module 224.

Power from the flight battery 241 is supplied to the motors 21 and 22 under the control of a flight controller 251. The flight controller 251 is communicated with from a remote control (not shown) with which the flight of the UAV may be supervised or operated by a person who is here called the remote pilot. The communication module 224 receives the signals from the remote control.

A support 36 for the blower section 3 is attached to the connector block 26. The support 36 has a bearing shaft 362 standing upright on the connector block 26 which supports a frame 363 to be rotatable around the main axis (not shown) of the bearing shaft 362. The rotational position of the frame 363 with regard to the connector block 26 can be fixed by suitable fixing fasteners like screws (not shown) provided on the frame 363 and/or the bearing shaft 362.

A turbine fan 39 and an associated nozzle 31 are supported by bearings 361 on the frame 363. The bearings 361 (only one is shown) allow a rotation of the nozzle 31 around the main axis 220 of the bearings 361 for adjusting the ejection direction of an air stream ejected from the nozzle 31. The air stream ejected from the nozzle 31 is generated by the turbine fan 39 and is mainly used for blowing dust off surfaces to be cleaned. Therefore, this air stream is also called the cleaning air stream. The position of the nozzle 31 with regard to the bearings 361 and the frame 363 can be fixed after adjustment by suitable fixing fasteners like screws (not shown) provided at the frame 363 and/or the bearings 361.

The turbine fan 39 is driven by a blower motor 35 under control of a blower motor controller 351 which is accommodated in the controller housing 25. The turbine fan 39 and the blower controller 351 are supplied with power from a blower battery 38 supported by the frame 363. The wiring for the power supply from the blower battery 38 to the blower controller 351 is realized by a wiring (not shown) passing through or along the rack 242, studs 27, connector block 26 and bearing shaft 362. The connection of the flight controller 251 and the blower controller 351 can be realized by wiring inside the controller housing 25, but these elements may also be provided as one unit which is commonly supplied with power from the flight battery 241.

On the upper end of frame 36 (on the uppermost bar thereof) a traverse structure 37 is fixed which extends parallel to the central axis 221 of the nozzle 31. On the traverse structure 37 there are arranged the blower battery 38, a camera 33 on a camera support 34 and a laser pointer 32. The camera 33 and the laser pointer 32 are arranged to have a main viewing/light emitting axis 223 which lies in the same vertical plane as the main axis of the nozzle 31. In this way, the laser pointer 32 allows targeting the cleaning air stream ejected from nozzle 31 precisely to the places to be cleaned. The camera view from the camera 33 can be used to control the cleaning result of the cleaning air stream. The camera support 34 is adjustable to control the position and viewing direction of the camera 33. Additionally, the camera support 34 positions the camera 33 above and behind the opening of the nozzle 31 to reduce the influence of scattered dust on the picture quality. In particular, as can be seen in FIG. 1, the blower section 3 is arranged above the multicopter section 2. This has the effect that dust which is inevitably dispersed by the propulsion air stream from the propellers 28 is maintained underneath the blower section 3. The blower section 3 has its optical equipment (camera 33, laser pointer 32) arranged above and behind the opening of the nozzle 31. As a result, the dust blown horizontally or slightly downwardly by the nozzle 31 will be transported further downward by the propulsion air stream, so that a reflow of the dust to cover lenses of the optical equipment is reduced.

Figure 2:
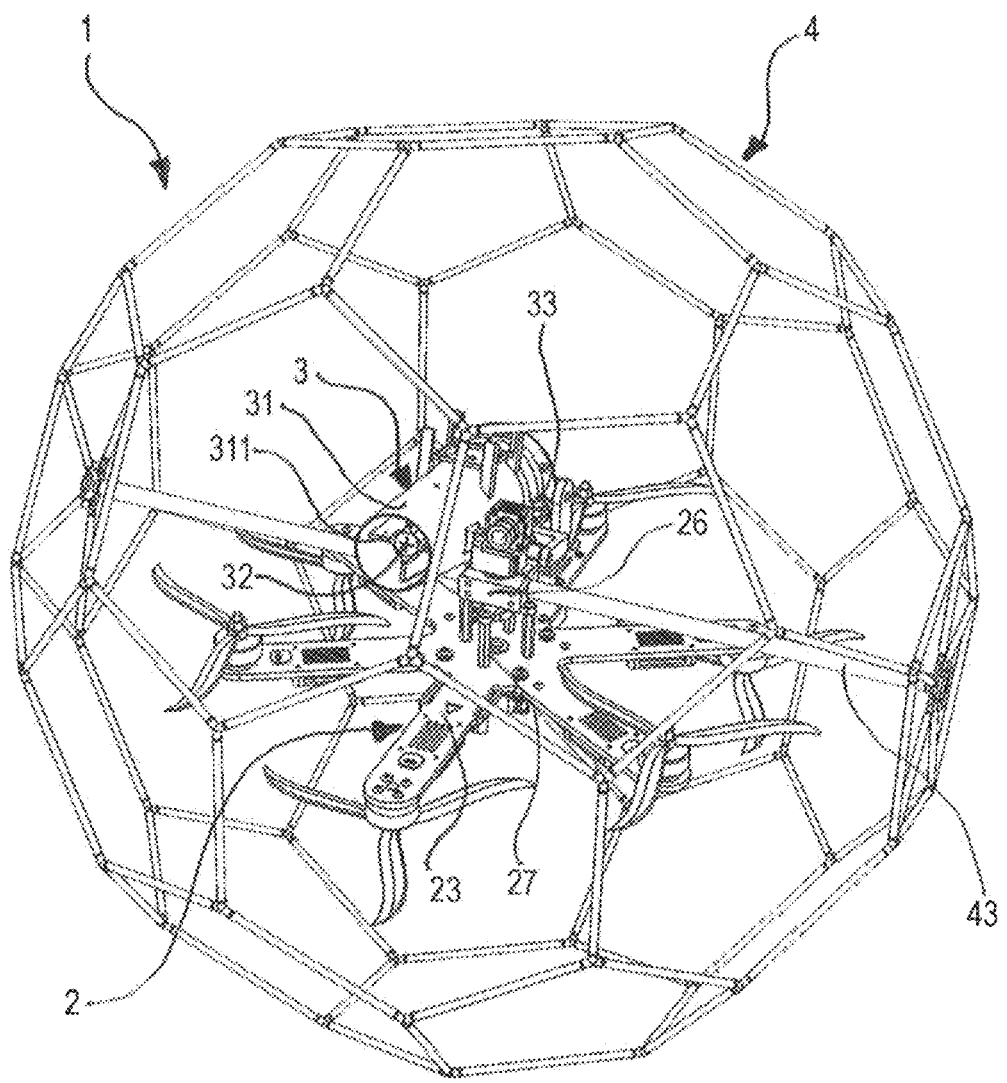

FIG. 2 shows an overall view of a modified embodiment of the UAV 1 of FIG. 1. This modified embodiment has substantially the same elements as the FIG. 1 embodiment so that the description of these elements omitted here. The description is focused on the differences to FIG. 1 embodiment. Where applicable, the same reference signs are used for the same or functionally same elements.

One difference in this embodiment is the arrangement of the camera 33 sideways of and attached to the nozzle 31 of the turbine fan 39. This arrangement of the camera 33 allows a height reduction of the blower section 3. In this way, the combination of the multicopter section 2 and the blower section 3 of this embodiment becomes more compact, and the space enveloped by the protective cage 4 becomes smaller. As a result, the UAV 1 becomes more compact.

Furthermore, the traverse structure 37 etc. can be omitted to reduce the weight of the UAV 1 thereby extending operation time per battery charge.

As is shown in FIG. 2, the nozzle 31 has a circular opening. Control of the flow inside the nozzle 31 and of the open jet ejected from the nozzle 31 is supported by a grid of air guides 311 inside the nozzle 31. A laser pointer 32 is arranged in the center of the grid of air guides 311 and thereby in the center of the opening of the nozzle 31. The laser pointer beam is arranged along the central axis of the nozzle 31 so that the direction of the emitted laser light coincides with the central axis of the nozzle 31. Consequently, the laser light has the same direction as the cleaning air stream ejected from the nozzle 31.

The laser pointer 32 is a cross-line-laser which emits an aiming cross which is clearly visible since it is composed of two crossing lines of laser light. Such an aiming cross is better visible than a smaller laser spot. Due to the arrangement of the laser pointer 32 in the center of the nozzle opening and in line with the extension direction of the nozzle 31, easy targeting of the cleaning air stream is obtained.

The provision of the laser pointer 32 inside the opening of the nozzle 31 has the additional effect that it reduces the cross section of the opening, thereby increasing the blowing velocity of the cleaning air stream.

The camera 33 and the nozzle 31 are arranged such that the main axis of the nozzle and the main axis of the camera 33 may be set to be on the same horizontal plane. This allows a precise observation of the effects of the cleaning air stream and the targeting thereof. Camera 33 is fixed on a support which allows changing or pivoting the viewing direction of the camera 33. This feature allows pivoting of the camera 33 downward e.g., for landing, if the UAV's landing spot is hardly visible for the remote pilot or is even too far away for vision control of the landing. Additionally, the movability of the camera 33 can also be used for orientation in the flight environment if the view to the operation area of the UAV is obstructed.

As a further difference to the UAV 1 of FIG. 1, in the UAV 1 of this modified embodiment, four studs 27 are provided to connect the multicopter section 2 to the beam 43 via the connection block 26. With this arrangement of the studs 27 in a square, stiffness of the connection is improved. The upper surface of the arms 23 are substantially flat surfaces on which a flight battery and/or a blower battery (not shown) may be positioned. The flight battery and the blower battery may be split into several units which can be (evenly) distributed over the stellate arm plate forming the arms 23. With such a design, a compact size of the multicopter section 2 and the blower section 3 is obtained. With a compact design, the size of the protective cage 4 can also be reduced.

Finally, the UAV 1 is equipped with a distance lock (not shown) in both embodiments. The distance lock comprises distance sensors 300 arranged to detect distances in the vertical and/or horizontal direction. The distance sensors 300 may be ultrasonic devices which emit and detect ultrasound to measure distances from the time period between emitting ultrasound and receiving reflected ultrasound. The vertical sensor points vertically upward and is adapted to measure the distance to a ceiling or the like and provide the measurement result to the flight controller 251. The flight controller 251 uses this value for controlling the UAV flight to a constant height. The horizontal sensor points in the direction of the cleaning air stream and supplies the measured distance to the object to be cleaned to the flight controller 251. Thus, the flight controller 251 controls the UAV to fly at a constant distance to the object to be cleaned. Such a distance lock helps the remote pilot in flying the UAV but may also be used in autonomous flight. As the distance sensor, microwave sensors using microwaves instead of ultrasound may also be used.

Figure 3:
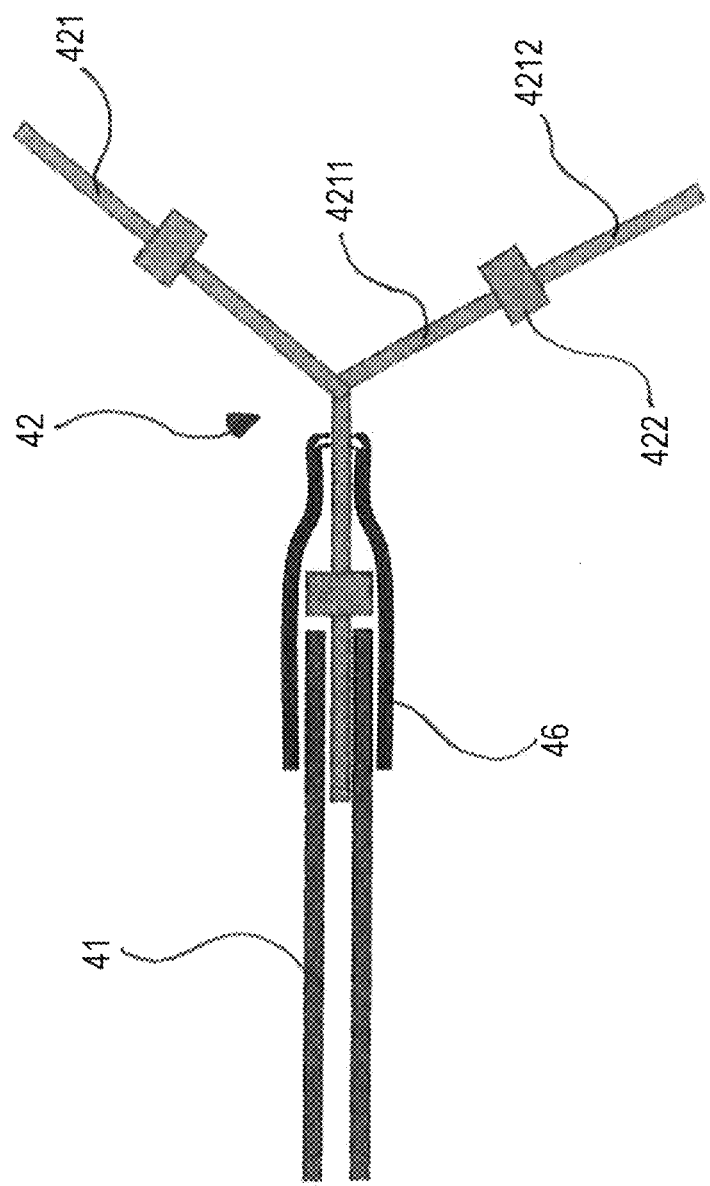

FIG. 3 shows a detail of the connection between a carbon fiber pipe 41 and a node 42 of the protective cage 4 of the UAV 1 shown in FIG. 1.

The node 42 has a plurality of bars 421 which are connected to each other at one end thereof. The bars 421 are made from aluminum for the protective cage 4, but may be made from other suitable materials. For example, polymer materials can be used which have some elasticity and robustness which resist breaking when hard contacts with surrounding surfaces occur. The bars 421 are connected by welding, and the number and the direction of the bars 421 in each node may be different and is set according to the shape of the protective cage 4 at the particular node 42. Alternatively cast nodes or 3D-printed nodes can also be used.

Each bar 421 has an outer diameter smaller than the inner diameter of the carbon fiber pipe 41, so that the bar 421 can be partly inserted into the carbon fiber pipe 41. Further, each bar 421 has a node-side portion 4211 and a pipe-side portion 4212 on either side of a collar 422 formed on each bar 421.

The collar 422 is fixed in a middle area of the bar 421 and has a diameter which basically corresponds to the outer diameter of the carbon fiber pipe 41. Thus, as can be seen in FIG. 3, the pipe-side portion 4212 can be inserted into the carbon fiber pipe 41 until the collar 422 rests on the end face of the corresponding carbon fiber pipe 41. Preferably, the pipe-side portion 4212 is glued into the end portion of the carbon fiber pipe 41. Alternatively, for quick repair an exchange of parts, even in the field of operation, any snap-on-type joint may be used. Also, the use of bayonet-couplings is possible i.e., a fastening mechanism consisting of a cylindrical male side with one or more radial pins, and a female receptor with matching L-shaped slot(s) and with spring(s) to keep the two parts locked together.

A sleeve 46 is shown which envelops the end portion of the carbon fiber pipe 41 and the pipe-side portion 4212, the collar 422 and at least a part of the node-side portion 4211 of one bar 421 of a node 42. Here, a shrink sleeve is used for the sleeve 46. Alternatively, a piece of an elastic tube may be used. The sleeve maintains the connection of the node 42 and the carbon fiber pipe 41 even if the glued connection between the pipe-side portion 4212 of the bar 421 and the carbon fiber pipe 41 is broken when the UAV 1 hits a solid element in a collision. Apart from that, the sleeve 46 has the objective to avoid scattering of any debris from the protective cage 4 into its environment when the UAV 1 has such a collision.

In a modified embodiment of FIG. 3, the sleeves are dimensioned to extend over the whole length of the carbon fiber pipe. For reasons as to weight, this feature may be applied to those pipes which are prone to wear due to ground or wall contact. Carbon fiber pipes can break more easily when they are scratched. In case of broken pipe, the sleeve can maintain the connection and holds the pieces of the broken pipe together.

In an alternative solution, pre-assembled portions of the protective cage may be coated with an elastic but sufficiently tough material like an elastomer. A thick coating may be obtained by multiple immersion of the portions of the protective cage into a suitable material solution.

I claim:

1. An unmanned aerial vehicle (UAV) comprising:
   a multicopter section for flying the unmanned aerial vehicle in air;
   a blower section attached to the multicopter section for generating an air stream for blowing dust off from surfaces;
   a flight controller for controlling the multicopter section;
   a blower controller for controlling the blower section;
   a power supply connected to supply power to the multicopter section and the blower section; and
   wherein the flight controller and the blower controller are connected so that the blower controller supplies blower control commands generated by the blower controller to the flight controller and wherein the flight controller is arranged to use the supplied blower control commands to compensate for a thrust produced by the air stream from the blower section by control of the multicopter section;
   a protective cage surrounding the unmanned aerial vehicle including the multicopter section, wherein the protective cage comprises a mesh body, the mesh body comprised of:
   a plurality of pipes constructed of carbon fiber;
   a plurality of bars joined together, wherein each bar extends into one of the plurality of pipes to define a first connection, such that a node between multiple pipes is defined; and
   a sleeve which overlies and surrounds the bar and pipe at the first connection, said sleeve at least partly overlapping and elastically enclosing the bar and pipe of the first connection.

2. The unmanned aerial vehicle of claim 1 further comprising a collar fixed in a middle area of each bar, the collar having a diameter which corresponds to an outer diameter of the pipe at the first connection, the collar resting on an end face of the pipe and wherein the bar is glued within the pipe.

3. The unmanned aerial vehicle of claim 2 further comprising at least one camera attached to the blower section and oriented in a direction defined by the air stream, and wherein the camera provides a video link to a remotely located pilot for flying the unmanned aerial vehicle by remote control.

* * * * *